US008576410B2

(12) United States Patent
Jansen et al.

(10) Patent No.: US 8,576,410 B2
(45) Date of Patent: Nov. 5, 2013

(54) METHOD AND APPARATUS FOR DETERMINING A HEIGHT OF A NUMBER OF SPATIAL POSITIONS ON A SAMPLE

(75) Inventors: Maarten Jozef Jansen, Casteren (NL); Frans de Nooij, Eindhoven (NL)

(73) Assignee: Mitutoyo Corporation, Kawasaki (JP)

( * ) Notice: Subject to any disclaimer, the term of this patent is extended or adjusted under 35 U.S.C. 154(b) by 296 days.

(21) Appl. No.: 12/949,138

(22) Filed: Nov. 18, 2010

(65) Prior Publication Data

US 2011/0122420 A1    May 26, 2011

(30) Foreign Application Priority Data

Nov. 20, 2009   (EP) ...................................... 09176628

(51) Int. Cl.
*G01B 11/24* (2006.01)
(52) U.S. Cl.
USPC .......................................... 356/609; 356/612
(58) Field of Classification Search
None
See application file for complete search history.

(56) References Cited

U.S. PATENT DOCUMENTS

| 5,633,715 | A | 5/1997 | Ai et al. |
| 2002/0149781 | A1 | 10/2002 | Harasaki et al. |
| 2010/0260409 | A1* | 10/2010 | Ben-Levy ..................... 382/141 |

FOREIGN PATENT DOCUMENTS

| EP | 1471327 | 10/2004 |
| WO | 98/45745 | 10/1998 |

OTHER PUBLICATIONS

Kino et al, "Mirau correlation microscope", Sep. 10, 1990, Applied Optics, vol. 29, No. 26, pp. 3775-3783.*
Extended European Search Report dated Jun. 21, 2010 issued in European Patent Application No. 09176628.7.
R. Dandliker et al. 'Electronically scanned white-light interferometry: a novel noise-resistant signal processing' Optics Letters vol. 17, No. 9, May 1, 1992, pp. 679-681.
S. Chen et al. 'Fringe order identification in optical fibre white-light interferometry using centroid algorithm method' Electronics Letters vol. 28, No. 6, Mar. 12, 1992, pp. 553-555.
Lefevre H. C.: 'White-light interferometry for optical fiber sensors' PROC. OFs'7, Sydney, Australia, Dec. 1990, pp. 345-352.

* cited by examiner

*Primary Examiner* — Gregory J Toatley
*Assistant Examiner* — Amanda Merlino
(74) *Attorney, Agent, or Firm* — Rankin, Hill & Clark LLP

(57) ABSTRACT

The invention relates to a method and an apparatus for determining a height of a number of spatial positions on a sample, defining a height map of a surface of said sample. The method can involve irradiating the surface of the sample with light including a spatial periodic pattern in a direction perpendicular to an optical axis and moving parallel to the pattern, scanning the surface in the direction of the optical axis for each position of the surface and detecting the light reflected by the sample by a detector during the scanning. In any scanning position, only a single image is taken, and the scanning speed has a predetermined relation to the phase of the periodic pattern. Analyzing an output signal of the detector can involve, for each spatial position of the detector, determining of an amplitude of the signal detected during the scanning and determining a scanning location where the amplitude is maximal.

19 Claims, 4 Drawing Sheets

METHOD AND APPARATUS FOR DETERMINING A HEIGHT OF A NUMBER OF SPATIAL POSITIONS ON A SAMPLE

TECHNICAL FIELD

The subject invention relates to a method and apparatus for determining a height of a number of spatial positions of a sample.

BACKGROUND

WO-A-98/145745 discloses a method for determining a height of a number of spatial positions of a sample. In the method, three or more images have to be taken in every scanning position. The plurality of images is needed to reconstruct an intensity signal over a full width of a pattern so that an amplitude can be calculated for said scanning position. However, due to the need to make multiple images in each of the scanning positions, the scanning movement must stop to make the images at each of the scanning positions. This not only interrupts the scanning movement, but also takes a considerable time, thereby lengthening the process time.

SUMMARY

The following presents a simplified summary of the subject invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One object of the subject invention is to provide a novel method and apparatus wherein the abovementioned disadvantages can be avoided. This can be achieved by taking only a single image in any scanning position and having a scanning speed that has a predetermined relation to a horizontal speed of a phase of a projected spatially periodic pattern.

In one aspect of the subject invention, a method for determining a height of a number of spatial positions of a sample, defining a height map of a surface of said sample is provided. More particularly, in accordance with this aspect, the method can involve irradiating the surface of the sample with light including a spatial periodic pattern which is periodic in a direction perpendicular to an optical axis and moving in a direction parallel to the direction in which the periodic pattern is periodic; scanning the surface in the direction of the optical axis and for each position of the surface; and detecting light reflected by the sample by a detector during the scanning. The method can further involve determining, for each spatial position of the detector, an amplitude of the signal detected during the scanning and determining a scanning location where the amplitude is maximal. In any scanning position, only a single image is taken and the scanning speed has a predetermined relation to the phase of the periodic pattern.

The relation between the scanning movement in the direction of the optical axis and the phase or movement of the pattern perpendicular to the optical axis can provide a relation between the images made at different positions. The relation between the images made at different positions can be used in the subsequent processing of the images to reconstruct the height map. Since both movements can take place without stopping, it can be executed at a relatively high speed, thereby increasing the measurement speed.

In another aspect of the subject invention, an apparatus for determining a height of a number of spatial positions of a sample, defining a height map of a surface of the sample is provided. More particularly, in accordance with this aspect, the apparatus can include a light source adapted to generate a light beam having a spatial periodic pattern which is periodic in a direction perpendicular to an optical axis and which moves in a direction in which the pattern is periodic; an optical detector adapted to convert received light into electrical signals; optical means for directing light from the light source to the surface and for directing light reflected by the surface to the optical detector; a processing unit adapted to control the scanning means to perform a scanning action to control the movement of the pattern means, to receive the signals from the optical detector, and to convert the signal received from the optical detector into a height map. The processing unit can be adapted to make only a single image in any scanning position and to control the scanning speed to have a predetermined relation to a phase of projected periodic pattern. The processing unit can also be adapted to determine, for each spatial position of the detector, an amplitude of the signal detected during the scanning and to determine a scanning location where the amplitude is maximal.

In one aspect of the invention, the light source for generating a light beam with a spatial periodic pattern which is periodic in a direction perpendicular to an optical axis can be implemented by a system that is based on LCoS display, LCD display, DMD display, LED array, scanning a projected mask pattern by putting a tilting parallel plate, scanning of a physical grating, a dia or mask pattern, or scanning mirror laser projection system. It is noted that any suitable light source can be used so long as a surface of a sample can be irradiated with light including a spatial periodic pattern which is periodic in a direction perpendicular to an optical axis. As stated above, there are several ways to obtain such light.

In another aspect of the invention, a movement of a spatial periodic pattern is an even movement and a scanning movement is an even movement. An even movement means herein a continuous movement without accelerations or decelerations. Although the even embodiment does not include accelerations and decelerations, one feature of the subject invention is the fixed relationship between the scanning speed in the direction of the optical axis and the phase change of the projected pattern.

In accordance with one aspect of the invention, an even movement of a projected pattern can be obtained by projecting an image of a physical grating that is not moving with an even movement. If the physical pattern moves in a cyclic manner while using a strobing source, then the strobing sequence can be chosen such that the observed periodic pattern appears to be moving in an even movement for an observing camera. Therefore, in one embodiment, an apparatus for determining a height of a number of spatial positions of a sample includes control means that is adapted to control the movement of the projected spatial periodic pattern to be an even movement and to control the scanning movement to be an even movement.

In accordance with another aspect of the invention, one feature of the invention is that a spatial periodic pattern is a sinusoidal periodic pattern. The sinusoidal pattern is a pattern having only a single frequency component, which is a frequency of a sinusoidal component itself, not containing any higher harmonics, thus allowing a minimum number of images to reconstruct a pattern. In accordance with still another aspect of the invention, a spatial periodic pattern is a binary periodic stripe pattern. This pattern can lead to a large number of harmonics, offering a possibility to use the harmonics for determining an axial location where the amplitude of an intensity signal is maximal. Therefore, the subject apparatus can include pattern means that is adapted to generate a sinusoidal periodic pattern or a binary periodic stripe pattern.

In accordance with one aspect of the invention, one feature of the invention is that more than two images are taken during a cycle of a spatial periodic pattern. A sinusoidal signal can be reconstructed when the frequency thereof is known and more than two samples of said signal are known. In this embodiment, a speed and a frequency of the pattern are known so that more than two samples are sufficient to reconstruct the signal without crossing the Nyquist sampling limit. It is noted that the number of images per cycle does not have to be an integer number. Therefore, the subject apparatus can include control means that is adapted to make more than two images during a cycle of the spatial periodic pattern.

In accordance with one aspect of the invention, a light source generates a strobing light of which the light pulses are synchronized with a phase of a moving periodic pattern. When using the strobing light source, a shutter for the detector may not be needed and the construction of the apparatus can be simple. Further, when using the strobing light source, it is possibility to use a grating as a pattern generator, wherein the grating only has to make a limited reciprocal movement. Therefore, the subject apparatus can include light source that generates a strobing light of which the light pulses are synchronized with the phase of the moving periodic pattern.

To find a height position of a point on a sample, a signal of a camera pixel can be processed in a similar way as is typically done by coherence peak detection methods that are used in vertical scanning white light interferometry. In some embodiments, calculation of the amplitude of the periodic pattern can be executed by performing the coherence peak detection method. In these methods, the height position can be derived by determining a focus position that is related to a modulation amplitude of a time-modulated signal. The modulation is caused by an interference phenomenon instead of by observing a spatially modulated signal by means of a spatial light projector. Examples of such methods can be found in, for example, U.S. Pat. No. 5,633,715; May 1, 1992, Vol. 17, No. 9, OPTICS LETTERS, "Electronically scanned white-light interferometry: a novel noise-resistant signal processing"; Electronics Letters, 12, Mar. 1992, Vol. 28, No. 6, "Fringe order identification in optical fibre white-light interferometry using centroid algorithm method"; and LEFEVRE H. C., "White-light interferometry for optical fibre sensors," Proc. OFS'7, Sydney, Australia, December 1990, Pub. IREE, ISBN 0-909-384-24-5, pp. 345-352, which are hereby incorporated by reference.

In accordance with one aspect of the invention, a method for calculating an amplitude of a periodic pattern involves subjecting an intensity signal to a Fourier transform; removing the signal components of the Fourier transformed signal which are not related to a modulation of a projected spatially scanned pattern including and removing the phase conjugate frequencies; subjecting the resulting signal to an inverse Fourier transform; taking the absolute value of the inverse Fourier transformed signal; and determining the scanning position where the absolute maximum value is reached.

To obtain a full height map, a portion or all of the acts of the abovementioned calculation methods can be conducted for signals from an array of camera pixels. The relation between the images taken at different but defined focal positions can introduce new frequency components in the intensity signal. These can be removed by using filtering. Therefore, in one embodiment, the subject apparatus can include control means that is adapted to calculate an amplitude of a periodic pattern from an intensity signal by coherence peak detection methods that are commonly used in vertical scanning white light interferometry. In another embodiment, the subject apparatus can include control means that is adapted to calculate an amplitude of a periodic pattern by subjecting a signal to a Fourier transform; removing signal components of the Fourier transformed signal of which are not related to a modulation of a projected spatially scanned pattern; removing phase conjugate frequencies; subjecting the resulting signal to an inverse Fourier transform; taking the absolute value of the inverse Fourier transformed signal; and determining the scanning position where the absolute maximum value is reached.

In accordance with another aspect of the invention, a data carrier is provided. The carrier data can include digital instructions for performing acts of the subject methods as described herein.

To the accomplishment of the foregoing and related ends, the invention, then, includes the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
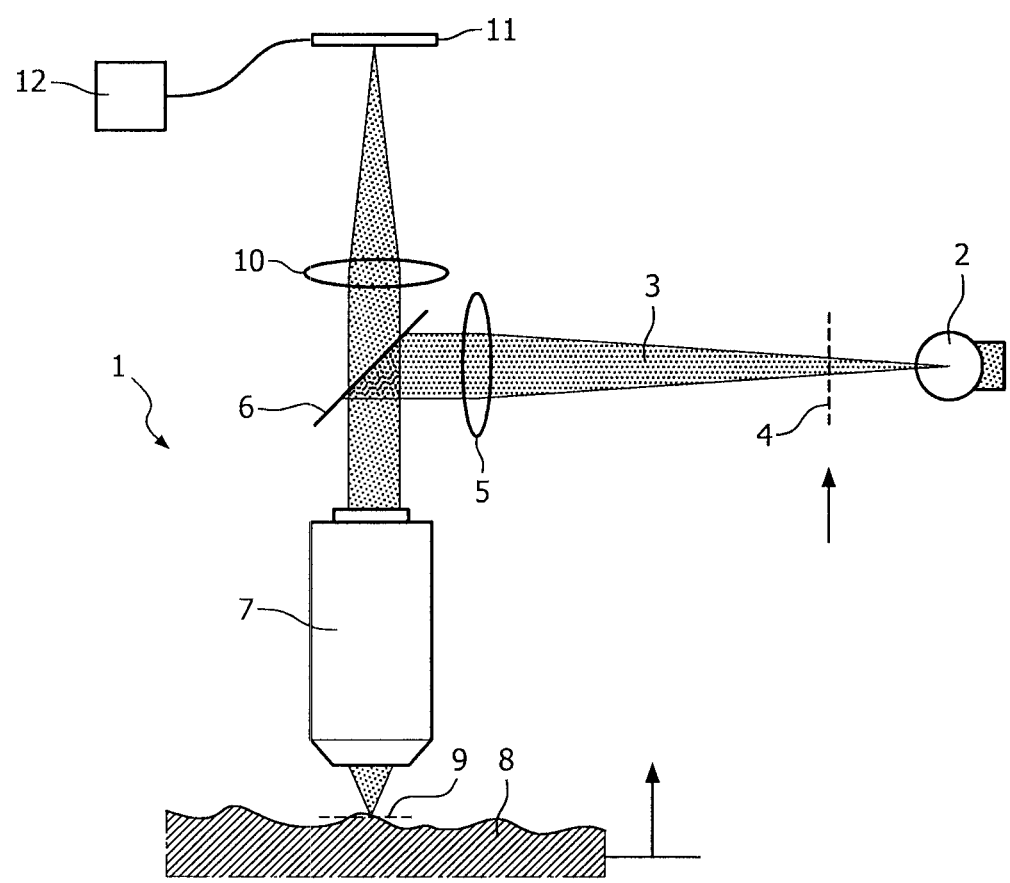
FIG. 1 is a diagram of an apparatus for determining a height of a number of spatial positions of a sample according to one aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details.

FIG. 1 illustrates an apparatus according to the subject invention. The apparatus 1 can include a light source 2 adapted to generate a light beam 3, a spatial pattern filter 4 which can be moved in a direction perpendicular to the optical axis of the light beam 3, a lens 5, and a beam splitter 6. The apparatus 1 can further include an objective 7 adapted to receive and conduct the light beam 3 and means for holding a sample 8 of which a height map of its upper surface 9 is to be determined. The apparatus 1 can include a second lens 10, a two-dimensional light detector 11 adapted to convert the light beam received into an electrical signal, which is sent to a control and processing unit, which can be formed of a digital computer 12. The objective 7 is adapted to scan the sample in the axial direction. In one embodiment, the scanning can be conducted by moving the sample as illustrated by an arrow in FIG. 1.

The light beam 3 generated by the light source 3 can be subjected to the spatial pattern filter 4, pass through the lens 5 and enter the beam splitter 6, which directs the light beam 3 to the objective 7. The objective 7 then directs the light beam to the surface 9 of the sample 8. The light beam reflected by the sample travels through the objective 7, the beam splitter 6 and the second lens 10, and enters the detector 11.

The spatial pattern filter 4 can include a pattern that is substantially periodic in one direction to obtain a substantially stripe like pattern. Although any suitable periodic spatial pattern can be used, it appears that the use of a sinusoidal pattern is advantageous. As stated above, the pattern filter 4 is adapted to be moved in a direction perpendicular to the axis of the light beam 3. The stripes of the stripe pattern can also extend perpendicular to the axis of the light beam 3 and perpendicular to the direction of movement. This implies that the direction of the sinusoidal variation extends parallel to the direction of movement. Such a spatial periodic pattern is depicted in the three left hand parts of FIG. 2. The three patterns are mutually shifted by 120° due to the movement of the pattern filter 4.

Figure 2:
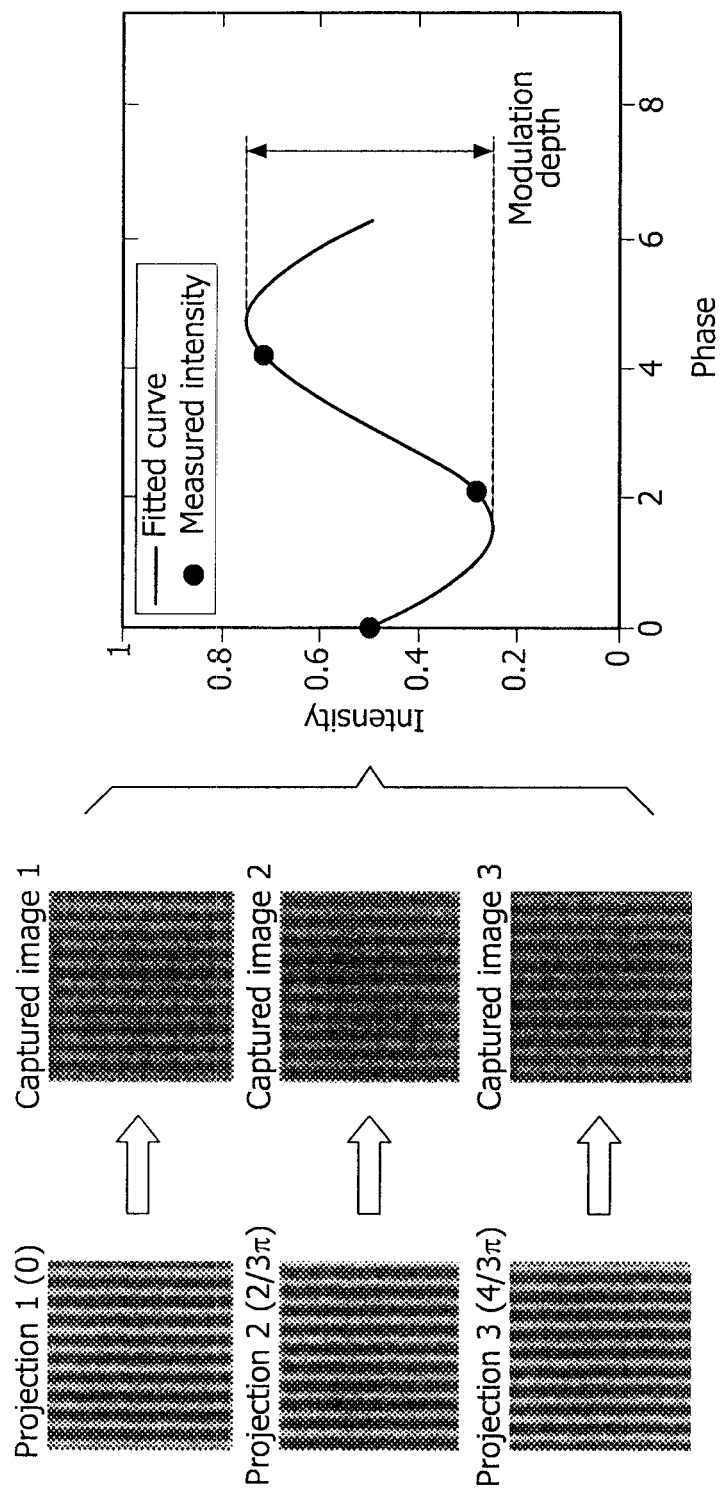
FIG. 2 illustrates a periodic pattern in three different positions and a resulting curve representing a modulation depth according to the prior art.

In conventional apparatuses, several pictures are made by a detector at every scanning position of an objective, such as illustrated in the left hand part of FIG. 2. Then signals into which the three pictures are converted by the detector are processed by a processing unit to reconstruct an intensity function for every pixel or spatial unit within a whole surface of the detector and the sample as a function of a phase of the shift of the pattern. The reconstruction for a single pixel is illustrated in the right hand part of FIG. 2. The use of three pictures at different phase positions of the spatial filter or alternative projecting means allows reconstructing the intensity signal. For each of the spatial positions, a modulation depth or amplitude is calculated. At the positions where the projected image of the spatial filter or projecting means is in focus, the amplitude of the signal for said pixel or spatial position is maximal. The scanning position at which this amplitude is maximal is assumed to be the height of the sample. The conventional method requires three images to be taken in every scanning position and therefore the scanning movement is intermittent.

Contrary to the conventional methods and apparatuses, the method and apparatus according to the subject invention can allow a continuous scanning movement so that for every scanning position only a single picture is taken. This implies that pictures made by the method and apparatus according to the subject invention will necessarily relate to different scanning positions. However, due to the fact that the difference in scanning positions between consecutive pictures is limited and the presence of a fixed relation between the scanning movement and the phase change of the projected spatial pattern, there is a relation between subsequent pictures which can be used for reconstruction of the required intensity signal. The fixed relation between the phase of the projected spatial pattern and the scan movement of the objective or sample can facilitate the reconstruction of the required intensity signal.

In some instances, there are some boundary conditions to allow the method of the invention to work (e.g., to reconstruct the intensity signal). In one embodiment, the frequency of the shutter of the camera or the strobing frequency of the strobing light source is set such that more than two pictures are made during a full cycle of the spatial filter to satisfy the Nyquist criteria. Contrary to the conventional methods, the number of pictures per cycle does not have to be an integer.

In another embodiment, the ratio between the modulation speed and the scanning speed is related to a required depth of field. A preselected number of pictures per cycle may imply that more pictures need to be taken to obtain a more accurate depth of field, albeit with a lower speed.

Figure 3:
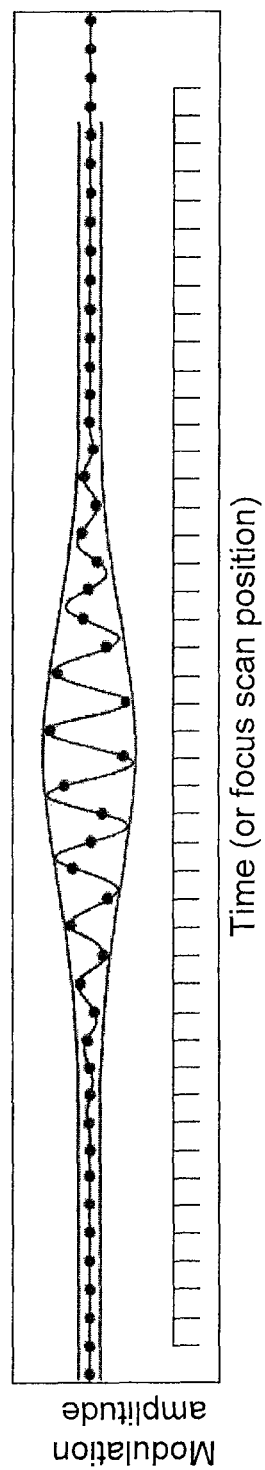
FIG. 3 illustrates a curve representing a modulated intensity signal according to one aspect of the subject invention.

The method according to the subject invention can involve continuous scanning during which pictures are made according to the above conditions. The signals resulting from the scanning are fed to the control and processing unit. A modulation amplitude signal can be determined as a function of the scanning movement for every pixel. This leads to the signal as illustrated in FIG. 3.

Figure 4:
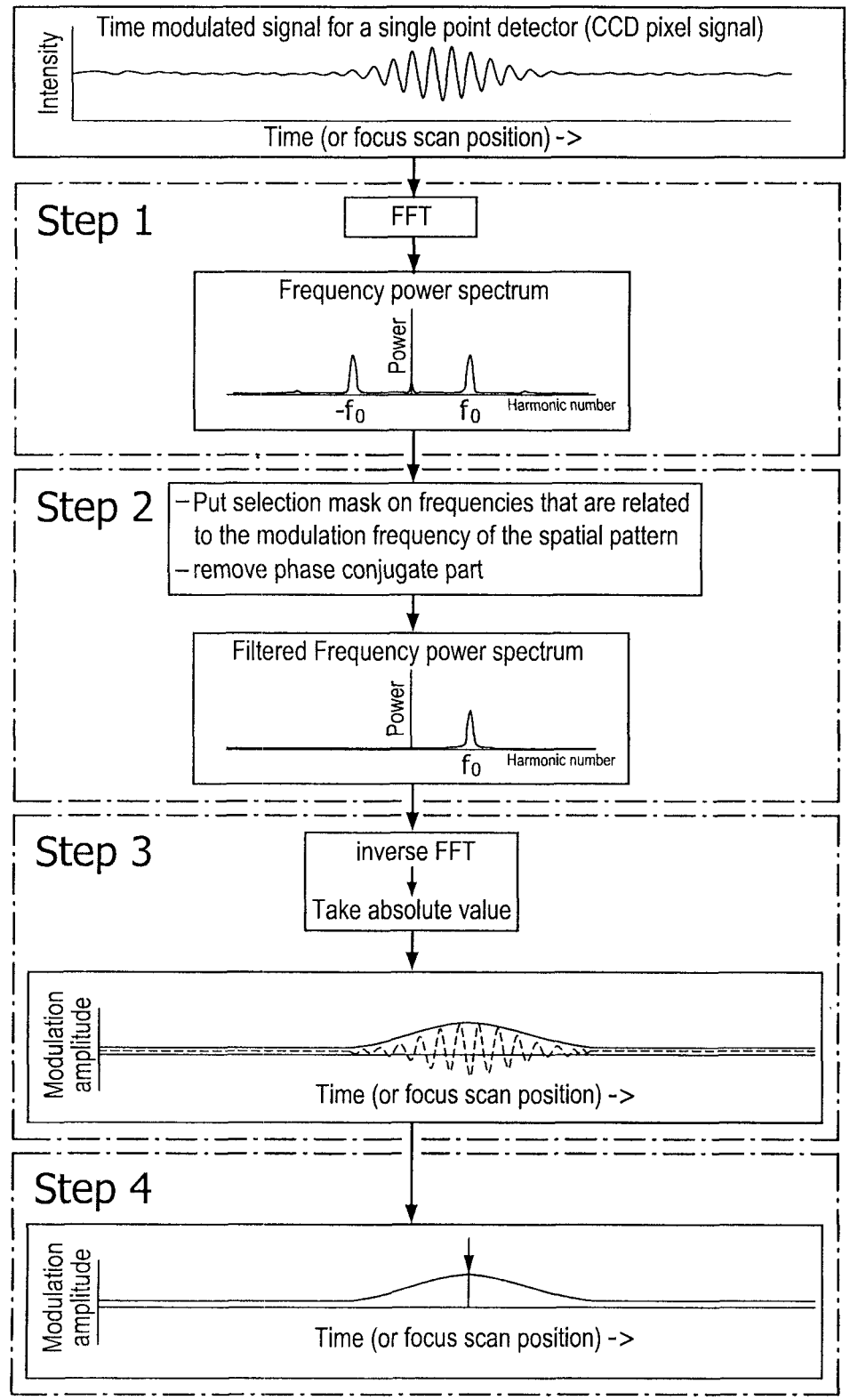
FIG. 4 is a diagram of a method for determining a height of a number of spatial positions of a sample according to one aspect of the subject invention.

The scanning position at which the amplitude is maximal is a position where the optical system is in focus. To determine said position, the steps illustrated in FIG. 4 can be executed under control of the processing unit. The top drawing of FIG. 4 shows a signal of a spatial position of a detector relating to a spatial position of a sample. The signal, together with signals relating to the other spatial positions, are provided to a processing unit, where the signals are initially subjected to a Fourier transform, as illustrated in Step 1 of FIG. 4. The resulting frequency spectrum is illustrated under "Step 1" of FIG. 4.

In Step 2, a selection mask or filter is applied to the Fourier transformed signal so that only frequency components remain, which are related to a modulation frequency of a spatial pattern. Also a phase conjugate part of the signal is removed. The resulting frequency spectrum is illustrated under "Step 2" of FIG. 4. In step 3, the resulting signal is subjected to an inverse Fourier transform. The absolute value is taken from the resulting signal. The results are illustrated under "Step 3" of FIG. 4. In Step 4, the scanning position relating to the maximum of said absolute value is determined. The position is a peak position or position with a maximal amplitude where the system is in focus, and this position represents the height of the sample. The resulting heights for each spatial position are combined to form a height map of the sample.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain," "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain," "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. A method for determining a height of a number of spatial positions on a sample, defining a height map of a surface of said sample, the method comprising:

irradiating the surface of the sample with light comprising a spatial periodic pattern which is periodic in a direction perpendicular to an optical axis and moves in a direction parallel to a direction in which the periodic pattern is periodic;

scanning the surface in the direction of the optical axis and for each position of the surface;

detecting light reflected by the sample by a detector during the scanning and converting the light reflected by the sample into signals; and determining, for each spatial position of the detector, an amplitude of the signal detected during the scanning and determining a scanning location where the amplitude is maximal, wherein in any scanning position only a single image is taken;

the scanning speed has a predetermined relation to a phase of the periodic pattern; and the light reflected by the sample travels over partially the same path as the light irradiating of the sample.

2. The method of claim 1, wherein the movement of the phase of the spatial periodic pattern is an even movement and a movement of the scanning the surface is an even movement.

3. The method of claim 1, wherein the spatial periodic pattern is a sinusoidal periodic pattern or a binary periodic stripe pattern.

4. The method of claim 1, wherein more than two images are taken during a cycle of the spatial periodic pattern.

5. The method of claim 1, wherein the surface of the sample is irradiated with the light from a light source that generates a strobing light of which the light pulses are synchronized with a phase of projected periodic pattern.

6. The method of claim 1, wherein determining the amplitude of the signal is executed by a coherence peak detection method.

7. The method of claim 6, wherein determining the amplitude of the signal comprises:

subjecting the signal to a Fourier transform;

removing signal components of the Fourier transformed signal which are not related to a modulation of the projected spatially scanned pattern;

removing phase conjugate frequencies;

subjecting the resulting signal to an inverse Fourier transform;

taking an absolute value of the inverse Fourier transformed signal; and determining a scanning position where an absolute maximum value is reached.

8. A computer-readable medium storing a non-transitory computer executable program that, when executed, perform the acts of claim 1.

9. The method of claim 1, wherein detecting the light reflected by the sample comprises detecting light reflected by the sample traveling over partially the same path as the light with which the surface is irradiated.

10. The method of claim 1 further comprising:

passing the light directed by the optical means from the light source through an objective; and passing the light reflected by the surface through said objective.

11. An apparatus for determining a height of a number of spatial positions on a sample, defining a height map of a surface, the apparatus comprising:

a light source adapted to generate a light beam having a spatial periodic pattern which is periodic in a direction perpendicular to an optical axis and which moves in a direction in which the pattern is periodic;

an optical detector adapted to convert received light into electrical signals;

optical means for directing light from the light source to the surface and for directing the light reflected by the surface to the optical detector; and a processing unit adapted to control scanning means to perform a scanning action, to control movement of the pattern, to receive the signals from the optical detector, and to convert the signal received from the optical detector into a height map, wherein the processing unit is adapted to make only a single image in any scanning position and to control the scanning speed to have a predetermined relation to a phase of projected periodic pattern;

the processing unit is adapted to determine, for each spatial position of he detector, an amplitude of the signal detected during the scanning and to determine a scanning location where the amplitude is maximal; and an optical path of the light directed by the optical means to the surface is parallel to an optical path of the light reflected by the surface to the optical means.

12. The apparatus of claim 9, wherein the processing unit is adapted to control the movement of the phase of the projected spatial periodic pattern to be an even movement and to control the scanning movement to be an even movement.

13. The apparatus of claim 9, wherein the pattern is adapted to generate a sinusoidal periodic pattern or a binary periodic stripe pattern.

14. The apparatus of claim 9, wherein the processing unit is adapted to make more than two images during a cycle of the spatial periodic pattern.

15. The apparatus of claim 9, wherein the light source generates a strobing light of which the light pulses are synchronized with the phase of the moving periodic pattern.

16. The apparatus of claim 9, wherein the processing unit is adapted to calculate the amplitude of the periodic pattern by performing a coherence peak detection method.

17. The apparatus of claim 16, wherein the processing unit is adapted to calculate the amplitude of the periodic pattern by the following acts:

subjecting the signal to a Fourier transform;

removing signal components of the Fourier transformed signal which are not related to a modulation of a projected spatially scanned pattern;

removing phase conjugate frequencies;

subjecting the resulting signal to an inverse Fourier transform;

taking a absolute value of the inverse Fourier transformed signal; and determining a scanning position where an absolute maximum value is reached.

18. The apparatus of claim 11, wherein an optical path of the light from the optical means to the surface is in common with an optical path of the light from the surface to the optical means.

19. The apparatus of claim 11 further comprising:

an objective through which the light directed by the optical means from the light source passes and through which the light reflected by the surface passes.

* * * * *